United States Patent
Maple et al.

(10) Patent No.: US 9,921,893 B2
(45) Date of Patent: Mar. 20, 2018

(54) SERVER - CLIENT NEGOTIATIONS IN A MULTI-VERSION MESSAGING ENVIRONMENT

(71) Applicant: International Business Machines Corporation, Armonk, NY (US)

(72) Inventors: Elizabeth J. Maple, Winchester (GB); Richard W. Pilot, Winchester (GB); Martin A. Ross, Winchester (GB); Craig H. Stirling, Winchester (GB); Ian T. Stirling, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 354 days.

(21) Appl. No.: 13/949,678

(22) Filed: Jul. 24, 2013

(65) Prior Publication Data

US 2014/0123149 A1    May 1, 2014

(30) Foreign Application Priority Data

Oct. 25, 2012 (GB) .................................... 1219198.7

(51) Int. Cl.
G06F 8/71     (2018.01)
G06F 9/54     (2006.01)
G06F 9/445    (2018.01)

(52) U.S. Cl.
CPC .......... *G06F 9/546* (2013.01); *G06F 9/44536* (2013.01)

(58) Field of Classification Search
None
See application file for complete search history.

(56) References Cited

U.S. PATENT DOCUMENTS

| 7,085,957 B2 * | 8/2006 | Sundareson et al. .......... 714/6.3 |
| 7,110,394 B1 * | 9/2006 | Chamdani ............... H04L 49/15 370/355 |
| 7,707,585 B2 | 4/2010 | Herrmann |

(Continued)

OTHER PUBLICATIONS

Microsoft Corporation, Microsoft Computer Ditionary, 2002, Microsoft Press, 5the ed. p. 460.*

(Continued)

*Primary Examiner* — Emerson Puente
*Assistant Examiner* — Zhi Chen
(74) *Attorney, Agent, or Firm* — Cantor Colburn LLP; Nicholas Bowman

(57) ABSTRACT

Disclosed is a method for selecting one of a plurality of versions of a software component of a message queuing software product to perform a task. One or more rules describing one or more characteristics of the plurality of versions of the software component is provided. Responsive to a determination that the rule applies to the task to be performed: a list of the plurality of versions of the message queuing software product is obtained, it is checked whether the software component of the one of the plurality of versions of the message queuing software product is available for use; and the most preferred version of the message queuing software component available is used to perform the task. Responsive to a determination that none of the rules apply to the task to be performed, the task is performed with the most preferred version of the message queuing software component.

20 Claims, 4 Drawing Sheets

(56) References Cited

U.S. PATENT DOCUMENTS

| | | | |
|---|---|---|---|
| 7,870,559 B2 | 1/2011 | Mallik et al. | |
| 8,023,408 B2* | 9/2011 | Herrmann | 370/229 |
| 8,171,472 B1 | 5/2012 | Binns et al. | |
| 8,464,228 B2* | 6/2013 | Campbell | 717/140 |
| 2001/0005903 A1* | 6/2001 | Goldschmidt Iki et al. | 725/50 |
| 2003/0050055 A1* | 3/2003 | Ting | H04M 3/42178 455/419 |
| 2004/0168153 A1* | 8/2004 | Marvin | G06F 8/71 717/120 |
| 2005/0114853 A1* | 5/2005 | Glider et al. | 717/170 |
| 2005/0203953 A1 | 9/2005 | McGee et al. | |
| 2007/0165531 A1* | 7/2007 | Labrador | H04L 47/10 370/235 |
| 2007/0208667 A1* | 9/2007 | Boctor et al. | 705/57 |
| 2008/0154905 A1* | 6/2008 | Paalasmaa | G06F 17/30905 |
| 2010/0293537 A1 | 11/2010 | Broussard et al. | |
| 2010/0318968 A1* | 12/2010 | Traut et al. | 717/122 |
| 2012/0079457 A1* | 3/2012 | Makey | G06F 11/3688 717/124 |
| 2012/0102498 A1* | 4/2012 | Subramanya | G06F 9/50 718/104 |
| 2012/0174124 A1* | 7/2012 | Ward et al. | 719/331 |
| 2013/0111456 A1* | 5/2013 | Bonnell et al. | 717/170 |

OTHER PUBLICATIONS

Ihistand, IBM WebSphere MQ, Jul. 17, 2012, Wikipedia, pp. 1-8.*
Websphere MQ FTE and AMS • Deeper Dive, https://www-950.ibm.com/events/wwe/ca/canada.nsf/vLookup-PDFs/t.rob_-_wmqfte_and_ams_deeper_dive/$file/T.Rob%20, 60 pages.
Websphere MQ V7.1: Universal Messaging, Web Sphere MQ Value: Connectivity to, from and within an Enterprise, http://t-rob.net/Downloads/20111010_WSTC_WhatsNewInWMQv71.pdf, 77 pages.
IP.com, "Methods and apparatus to provide an optimal and specific environment by allowing multi install capable messaging configurations to utilise new operating system kernel options," IP.com No. IPCOM000213519D, Dec. 20, 2011.

* cited by examiner

SERVER - CLIENT NEGOTIATIONS IN A MULTI-VERSION MESSAGING ENVIRONMENT

PRIORITY

The present application claims priority to Great Britain Patent Application No. 1219198.7 filed on 25 Oct. 2012, and all the benefits accruing therefrom under 35 U.S.C. §119, the contents of which in its entirety are herein incorporated by reference.

BACKGROUND

The present invention relates generally to data processing and, more particularly, to a decision making layer and associated server-client negotiations to determine use of one or more of multiple versions of a messaging application.

Computer messaging applications are typically updated with new versions. Each new version usually has improved functionality so that it is able to perform functions not available before or to perform previously available functions, but with different options. The addition of this new functionality to a new version can sometimes degrade the performance and the memory requirements of other functionality when compared to a previous version.

Applications are usually designed to work with one allocated version of a messaging application at a time and will often not work with versions of a messaging application other than the one that they have been allocated to work with at a time. The version allocated can be changed, but the application can only work with one allocated version of a messaging application at a time.

This situation has the disadvantage that the application is sometimes unable to use functionality added in a new release of the messaging application, or if it is able to use the functionality, then a degraded performance or greater memory requirements may have to be accepted.

Web Services Policy Framework (WS-Policy) found at http://www.w3.org/TR/ws-policy/ is a specification that allows web services to have a set of rules to advertise their policies (on security, quality of service and the like) and allows web service consumers to specify their policy requirements. Authors of web service consumers review the policies advertised by the web services to determine whether or not the policies can be adhered to. For example, a web service consumer cannot access a web service that has a policy that requires all messages to be encrypted or signed in a certain way, unless that web service consumer does encrypt or sign messages in that certain way. Similarly, a web service having a policy requiring a timestamp could not be accessed by a web service consumer which sends a message that does not have a timestamp. WS-Policy does not maintain any list of web services or any information about how to choose one of a number of web services based on characteristics of the task to be performed.

Open Grid Services Infrastructure (OSGI) is a specification that discloses a framework in which services exporting the same interface can exist at different versions. These services can be imported dynamically at runtime, the importer of the services selecting the most appropriate of the different versions, typically the most recent version. OSGI does not disclose dynamically selecting the most appropriate of the different versions based on the usage to be made of the service.

SUMMARY

According to embodiment, methods, systems, and computer program products are provided for selecting one of a plurality of versions of a software component of a message queuing software product to perform a task. A method can include: providing one or more rules describing one or more characteristics of the plurality of versions of the software component; receiving information describing the task to be performed; for each one of the one or more rules, determining whether the rule applies to the task to be performed; responsive to a determination that the rule applies to the task to be performed: obtaining a list of the plurality of versions of the message queuing software product; for each one of the plurality of versions of the message queuing software product starting with a most preferred version and ending with a least preferred version, checking whether the software component of the one of the plurality of versions of the message queuing software product is available for use; and performing the task with the most preferred version of the message queuing software component available for use; and responsive to a determination that none of the rules apply to the task to be performed, performing the task with the most preferred version of the message queuing software component.

BRIEF DESCRIPTION OF THE SEVERAL VIEWS OF THE DRAWINGS

Preferred embodiments of the present invention will now be described in more detail, by way of example only, with reference to the accompanying drawings, in which.

DETAILED DESCRIPTION

Figure 1:
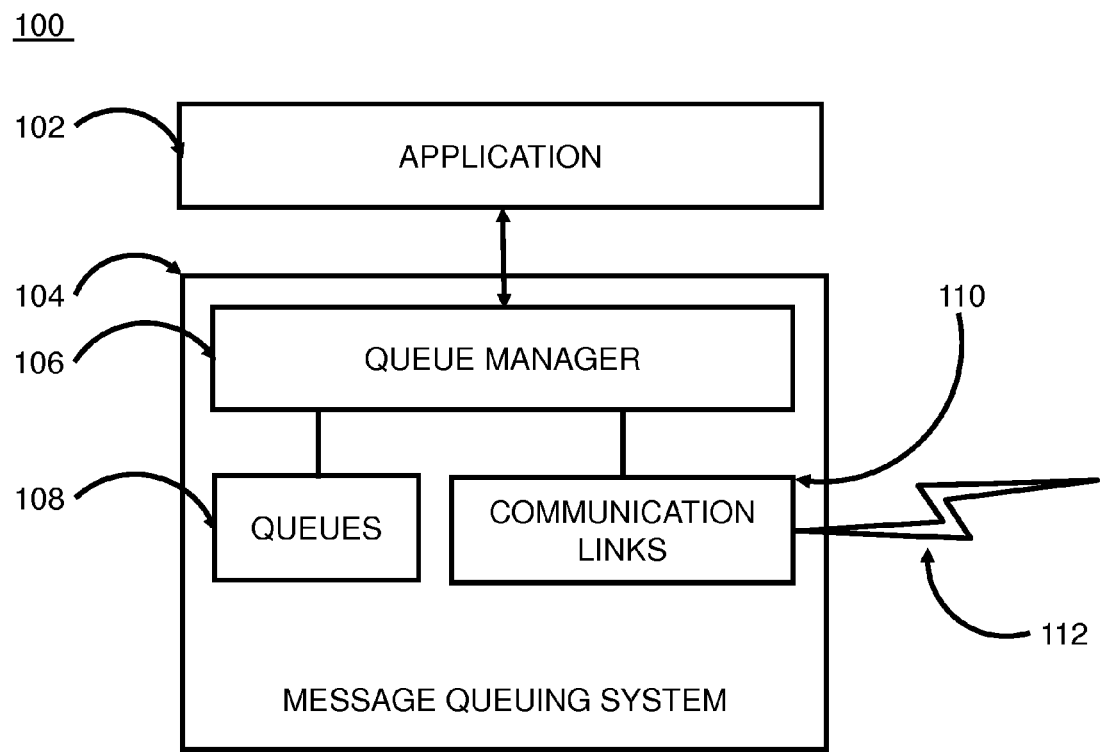
FIG. 1 shows a contemporary computer system that includes an application and a message queuing system.

Embodiments are directed to a decision making layer and associated server-client negotiations to determine use of one or more of multiple versions of a messaging application for different steps of a data processing operation or for data processing operations having different characteristics.

An embodiment can provided the ability for an application to be able to choose components from different coexisting messaging application versions running on a computer system so as to select an optimal setup specific to the actual requirements of the application. An embodiment can also provide for different components of the application to use the most appropriate components of the messaging application selected from different versions of the messaging application.

Embodiments of the present invention provide methods, systems, and computer program products for selecting one of a plurality of versions of a software component of a message queuing software product to perform a task. The method can include: providing one or more rules describing one or more characteristics of the plurality of versions of the software component; receiving information describing the task to be performed; for each one of the one or more rules, determining whether the rule applies to the task to be performed; responsive to a determination that the rule applies to the task to be performed: obtaining a list of the plurality of versions of the message queuing software product; for each one of the plurality of versions of the message queuing software product starting with a most preferred version and ending with a least preferred version, checking whether the software component of the one of the plurality of versions of the message queuing software product is available for use; and performing the task with the most preferred version of the message queuing software component available for use; and responsive to a determination that none of the rules apply to the task to be performed, performing the task with the most preferred version of the message queuing software component.

Embodiments can provide the advantage that a client application is able to choose components from the different coexisting message queuing software products installed on a computer system so as to select an optimal setup specific to the actual requirements of the application. Embodiments can also provide the advantage that different components of the client application are able to use the most appropriate components of the message queuing software product selected from the plurality of versions of the message queuing software products installed on the computer system.

In an embodiment, the rule selects one or more of the versions of the message queuing software product based on quality of service of each of the versions of the software product.

In an embodiment, the rule selects one or more of the versions of the message queuing software product based on characteristics of an individual message. This has the advantage that the optimum version of message queuing software product may be used for each type of message.

In an embodiment, the rule selects one or more of the versions of the software product based on the message size of an individual message.

In an embodiment, the most preferred version of the message queuing software product is the most recent version and the least preferred version of the message queuing software product is the least recent version. This has the advantage that, in the absence of other considerations, a most recent and therefore likely more efficient or better supported, version of the message queuing software product is used.

In an embodiment, the task to be performed is one of a plurality of steps of an operation of a client application, each of the plurality of steps being capable of using a different one of the plurality of versions of the message queuing software product. This has the advantage that execution of each of the plurality of steps is able to use an optimal version of the message queuing software product.

In an embodiment, the task is to be performed for a client application and the providing one or more rules comprises obtaining a list of characteristics from the client application, the list identifying characteristics that are important to the client application.

In an embodiment, providing one or more rules describing one or more characteristics of the plurality of versions of the software component comprises the generation of said one or more rules based on input from one or more of a database of, or containing information associated with, available and installed products, information delivered as a service over a network or other sources of information associated with available and installed products.

FIG. 1 shows a contemporary computer system 100 within a messaging network. Application 102 generates messages and sends them to message queuing system 104. Message queuing system 104 may include a queue manager 106, queues 108 and communication links 110, 112 to other message queuing systems. A queue 108 is a data structure used to store messages until they are retrieved by an application. Queues are managed by a queue manager 106. The queue manager is responsible for maintaining the queues 106 it owns, and for storing all the messages it receives from applications 102 or other queue managers onto the appropriate queues, and retrieving the stored messages in response to requests from applications 102.

Application 102 acts as a client in client-server interactions and negotiations with the messaging queuing system 104. The messaging queuing system 104 acts as a server in client-server negotiations with application 102.

Figure 2:
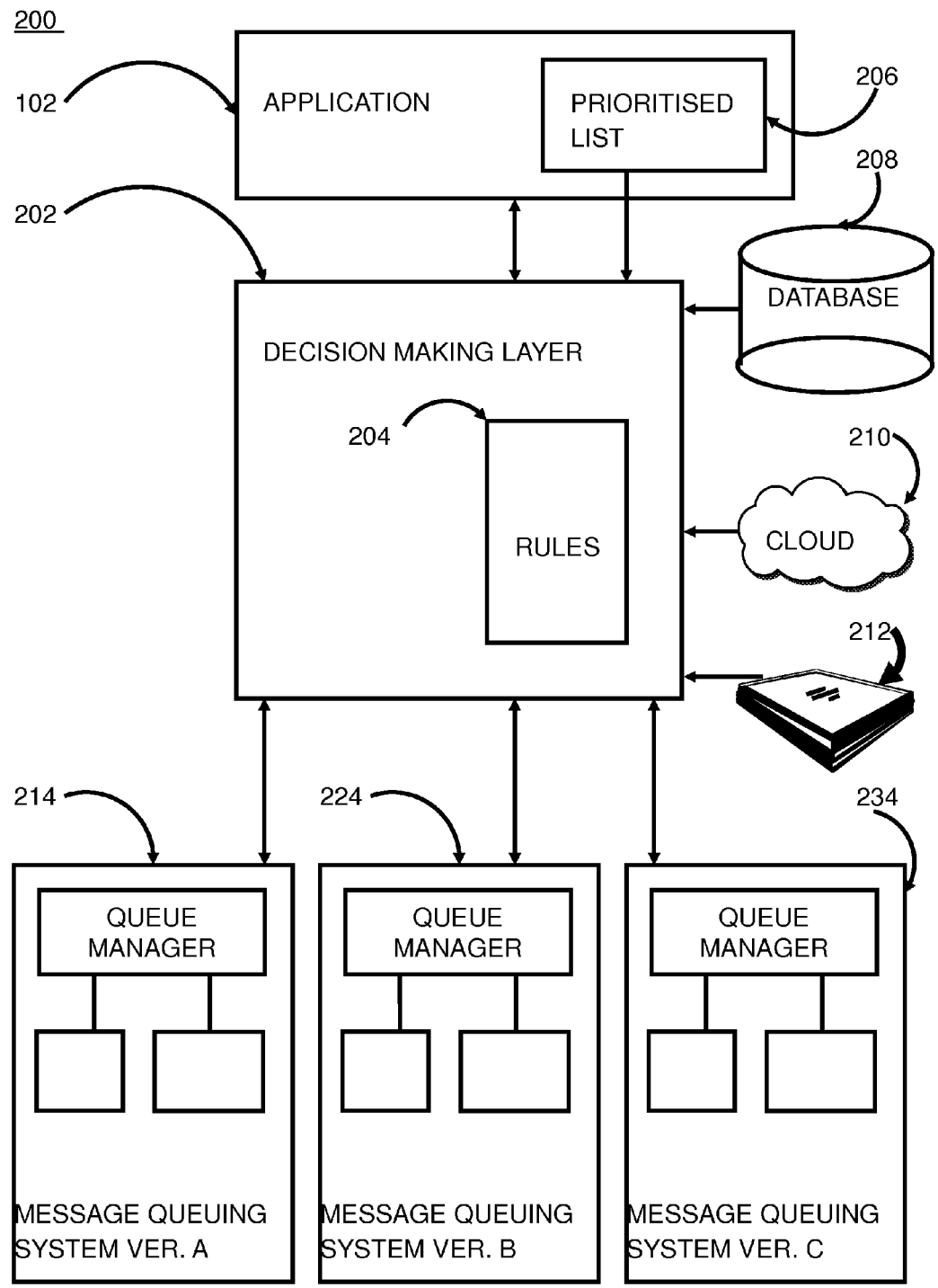
FIG. 2 shows a computer system that includes an application and a plurality of message queuing systems in accordance with an embodiment.

FIG. 2 shows an embodiment of a computer system 200 according to an embodiment. The system of FIG. 2 includes a plurality of versions of message queuing systems 214, 224, 234. In FIG. 2, these versions are shown as Ver. A, Ver. B and Ver. C. This nomenclature is for the purposes of simplicity, the actual versions in practice typically being represented by number, such as 3.1, 4.0, 4.1 and 4.2. Although FIG. 2 shows three versions, any number of versions from two upwards may be used.

The system of FIG. 2 also includes a decision making layer 202. The decision making layer 202 selects the optimal version of the queue manager 214, 224, 234 which is to be used for a particular task desired to be carried out for the application 102. As explained above, message queuing systems 214, 224, 234 are typically updated with new versions. The new versions usually have improved functionality so that they are able to perform functions not available before or to perform previously available functions, but with different options. The addition of this new functionality can sometimes degrade the performance and the memory requirements when compared to a previous version.

As an example of when it would be desirable to be able to choose which version of a message queuing system 214, 224, 234 to use, suppose a first version, Version A (214), has a higher throughput of large, non-persistent messages than Version B (224) and Version C (234). Also, suppose a second version, Version B (224), has a higher throughput of small persistent messages than Version A (214) and Version C (234). Now, suppose that application 102 splits message files that it wishes to send into large (perhaps 256k), non-persistent, messages with small (perhaps 2k-5k), persistent, checkpointing data. It would be desirable to use Version A (214) to send the large, non-persistent, messages and Version B (224) to send the small, persistent, checkpointing data.

Decision making layer 202 comprises rules 204 that are generated by the decision making layer 202 in response to inputs which it receives.

Such input from an application 102 may, for example, include a prioritised list 206 of which characteristics associated with a message queuing system 214, 224, 234 are most important to the application 102. For example, such a prioritised list may be, first, performance, second, memory footprint and third, functionality requirements. Each item in the prioritised list 206 may, optionally, be broken down into more detail as to the application's requirements. For example, performance may be further broken down into performance primarily for large and for non-persistent messages. The prioritised list 206 may contain any other characteristic that is important to the application 102 and may contain any number of those characteristics. The prioritised list 206 may be generated by the application 102 or an end user, or a combination of both.

Input may also come from a database 208 or from the cloud 210 (information that is delivered as a service over a network, typically the Internet). This input information may be as to which message queuing system 214, 224, 234 products are available, their functionality and/or performance, whether they are currently installed and whether they are available in the system 200 or it may be information about each of the versions of message queuing system 214, 224, 234 installed on the computer system 200. The input information may contain any combination of portions of, or all of, this information. The database 208 may be generated by a manufacturer, wholesaler, retailer or any third party or an end user. Similarly, the information from the cloud 210 may also be generated by a manufacturer, wholesaler, retailer or any third party or an end user.

Input about each of the installed versions of message queuing systems 214, 224, 234 may also come from performance reports, product specifications or problem resolution databases or many other sources 212. The input information may contain any combination of portions of, or all of, the information on functionality and/or performance of each version of message queuing system 214, 224, 234 available. Examples of such information include performance, processing power requirements, functionality in that version or memory requirements. The sources 212 may be generated by a manufacturer, wholesaler, retailer or any third party or an end user.

Figure 3A:
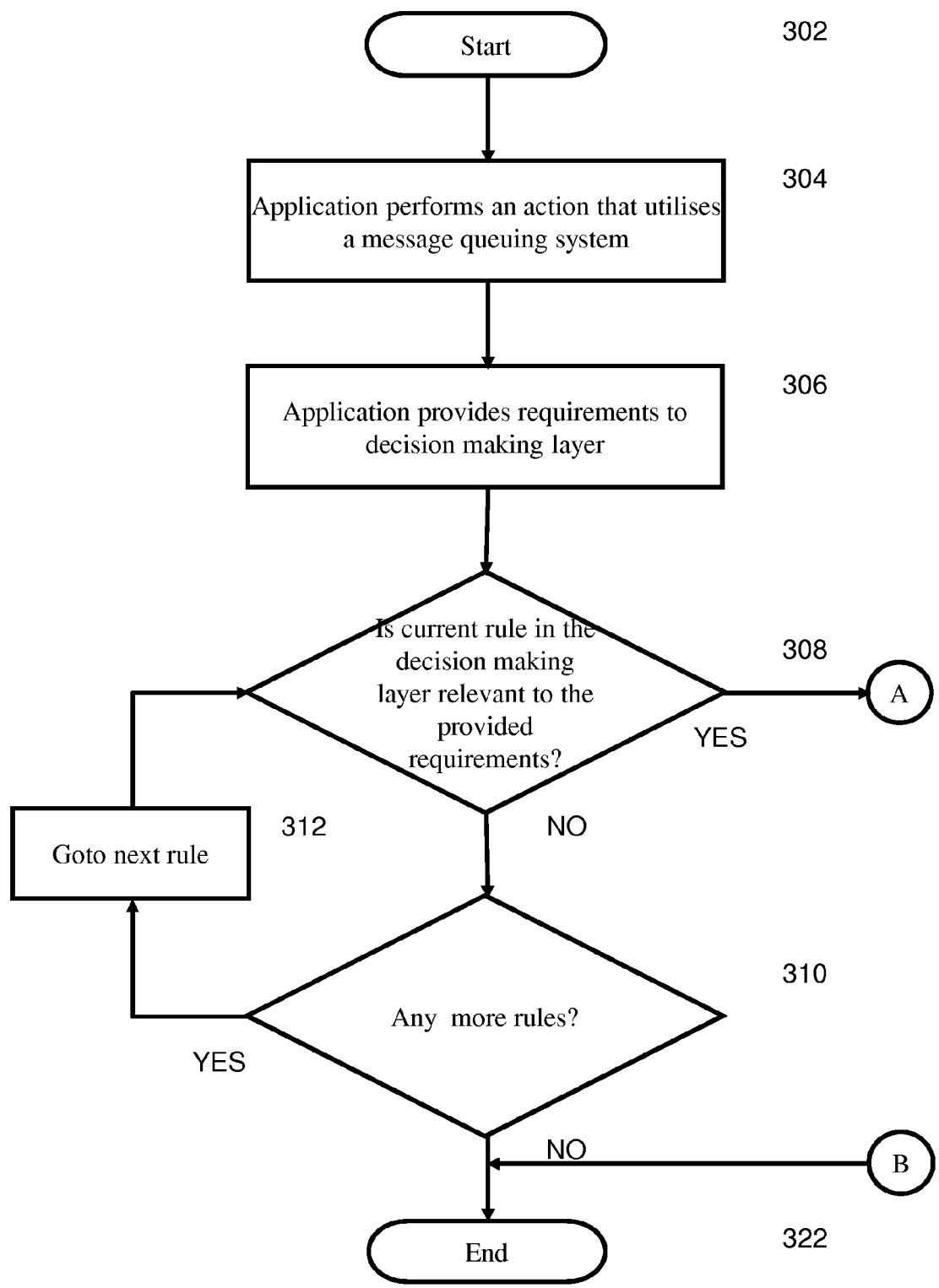
FIGS. 3A and 3B show flowcharts of a method for using the message queuing system of FIG. 2 in accordance with an embodiment.

Referring to FIG. 3, an embodiment of the present invention starts at block 302. The embodiment is implemented largely in the decision making layer 202 with input from and/or output to the application 102, the prioritised list 206 and any other source of input or output that may be appropriate, such as, for example, a list of installed versions of the message queuing system 214, 224, 234 obtained from the computer system 200. At block 304, an application 102 tells the decision making layer 202 that it wishes to perform an action that utilises a message queuing system 214, 224, 234. The action that the application 102 wishes to perform may be sending a message, which may be large or small and may be persistent or non-persistent. It could also be any other action that the application 102 might wish to perform with the message queuing system 214, 224, 234. This block is the start of a negotiating process in which the application 102 acts as a client in providing its requirements. At block 306, the application 102 provides the requirements it has for the action it wishes to perform to the decision making layer 202. An example of the requirements might be (i) a need for optimal performance with large (perhaps 256k) messages; and (ii) a need for a particular functionality to be supported. A first version, such as version A 214, may have optimal performance for the processing of large messages, but it may not support the particular functionality that it is desired to support. A second version, such as version B 224, may not have optimal performance for the processing of large messages, but it does support the particular functionality that it is desired to support.

Figure 3B:
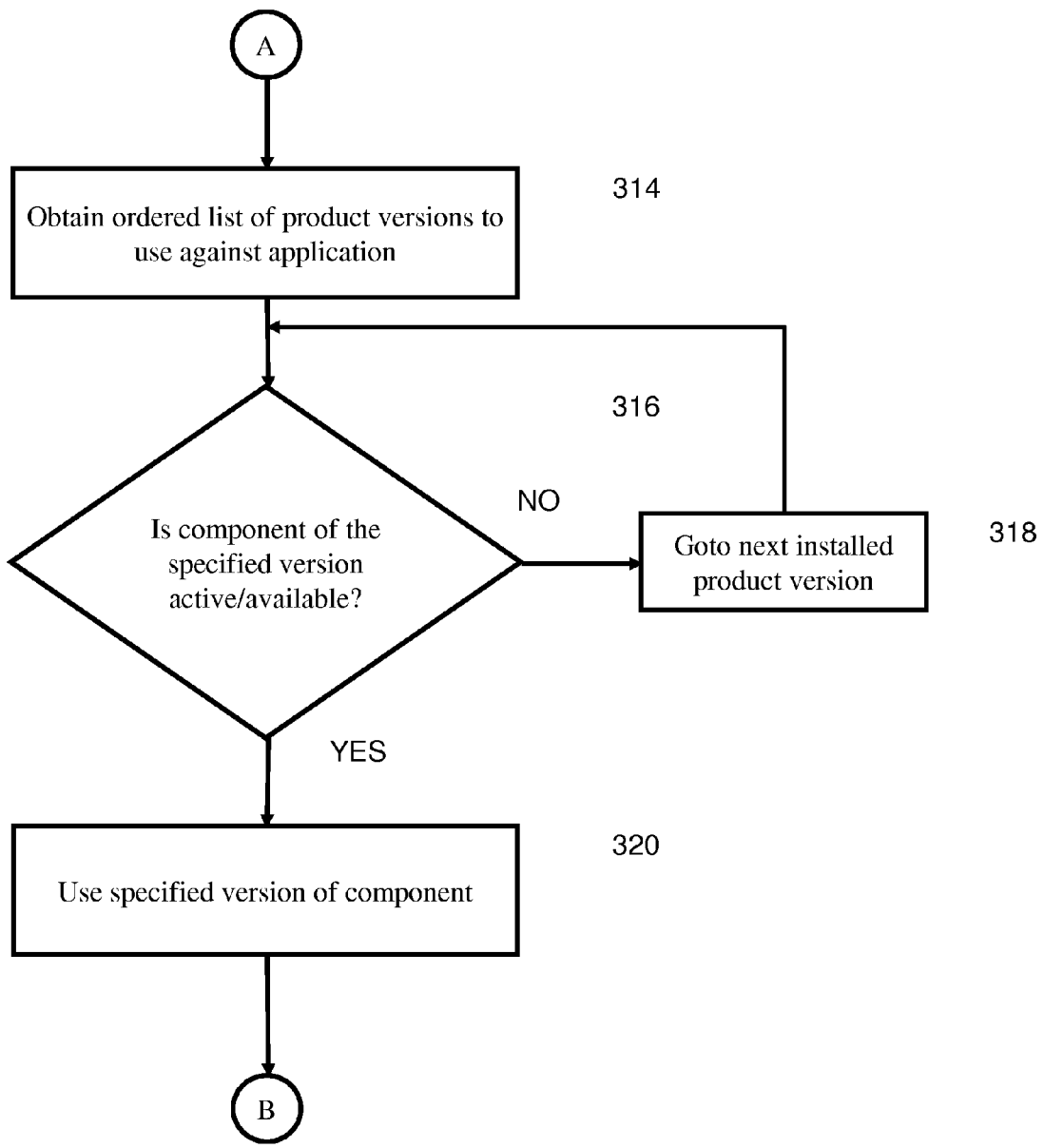

At block 308, if the current rule in the decision making layer is relevant to the provided requirements, then processing moves (at "A") to FIG. 3B.

At blocks 314, a list of product versions of the message queuing systems 214, 224, 234 is obtained. This list is in order of preference of use of the various product versions. Typically, that preference may involve more recent versions of the product being more preferable and less recent versions of the product being less preferable. Other criteria may alter or replace this preference. This list may contain information such as an identifier used by the computer system 200 to identify the different product versions, a location in storage where the product version may be found, a version identifier and a status of the version, for example, whether it is available or not. Any of these items may be omitted from the list and other items may be added.

At block 316, a check is made as to whether the component of the message queuing system 214, 224, 234 desired to be used is available in the first product version. This information may have been supplied as part of the list obtained above or it may be determined from elsewhere, such as from the system 200 itself. If the component is available then, at block 320, the version of the component in the first preference product version is specified to be used. If the component is not available, then processing moves to block 318 and the second preference or any subsequent preference installed product version is checked for whether the component of the message queuing system 214, 224, 234 desired to be used is available in the second preference or any subsequent preference installed product version and if so, whether it is an available version. If the component is found to be available then, at block 320, the version of the component in the first preference (or second preference or any subsequent preference) product version in which the component is found to be available is specified to be used and processing returns (at "B") to FIG. 3A. Processing ends at block 322.

In an embodiment, a form of redundancy is incorporated. For example, if the optimal message queuing system 214, 224, 234 is not available or is heavy loaded with other tasks, then the decision making layer 202 will select a less desirable, but still functional, version of the message queuing system to carry out the task. Rules 204 may be used to determine what the next, less appropriate, version to use is. For example, Ver. C is best, if not available or heavily loaded, then use Ver. A, if that is not available or is heavily loaded, then use Ver. B.

Returning to block 308, if the current rule in the decision making layer does not apply, then processing moves to block 310. At block 310, if there are no more rules 204 to be checked for relevance to the provided requirements, then processing ends at step 322. If there are more rules 204 to be checked for relevance to the provided requirements, then processing moves to block 312. At block 312, the next rule is obtained and then, at block 308, this next rule is checked for application.

In a variation of the above embodiment, the decision making layer may receive information from databases 206, the cloud 210 or other sources 212 as to updates or fix packs or similar being added to installed versions of message queuing products. These updates or fix packs may change the performance and/or functional characteristics of the versions of the message queuing products. The rules 204 are updated based on the information from databases 206, the cloud 210 or other sources 212.

Embodiments can take the form of a computer program accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk.

Current examples of optical disks include compact disk read only memory (CD-ROM), compact disk read/write (CD-RW), and DVD.

What is claimed is:

1. A method for selecting versions of a software component of a message queuing software product to perform a plurality of tasks, the method comprising:

receiving, from a client application, a first requirement relating to a first task of the plurality of tasks, the first task comprising sending a first message from the client application using the message queuing software product, the first requirement indicating a need for optimal performance of the first task with respect to a first attribute of the first message;

receiving, from the client application, a second requirement relating to a second task of the plurality of tasks, the second task comprising sending a second message from the client application using the message queuing software product, the second requirement indicating a need for optimal performance of the second task with respect to a second attribute of the second message;

identifying a plurality of versions of the software component that are available for use, the plurality of versions including a first version and a second version, the first version being a more recent version of the software component than the second version;

determining a first characteristic of the first version and a second characteristic of the second version, the first characteristic indicating that the first version provides a higher throughput than the second version for messages having the first attribute, the second characteristic indicating that the second version provides a higher throughput than the first version for messages having the second attribute;

determining, based at least in part on the first characteristic and the second characteristic, that the first version is a preferred version of the software component for satisfying the first requirement;

determining, based at least in part on the first characteristic and the second characteristic, that the second version is a preferred version of the software component for the satisfying the second requirement;

performing the first task using the first version and performing the second task using the second version, wherein the first task and the second task are performed at least partially concurrently;

receiving, from the client application, a third requirement relating to a third task of the plurality of tasks, the third task comprising sending a third message from the client application using the message queuing software product, the third message having the first attribute, the third requirement indicating a need for optimal performance of the third task with respect to first attribute;

determining, based at least in part on the first characteristic and the second characteristic, that the first version is a preferred version of the software component for satisfying the third requirement;

determining that the first version is heavily loaded with other tasks; and performing the third task using the second version.

2. The method of claim 1, further comprising:

receiving, from the client application, a fourth requirement relating to a fourth task of the plurality of tasks, the fourth task comprising sending a fourth message from the client application using the message queuing software product, the fourth requirement indicating a desired quality of service;

determining that a third version of the plurality of versions of the software component is capable of providing the desired quality of service;

determining that the third version is a preferred version for satisfying the fourth requirement; and performing the fourth task using the third version.

3. The method of claim 2, further comprising determining that the third version is capable of providing the highest quality of service among the plurality of versions of the software component.

4. The method of claim 1, wherein the first attribute is a message size greater than or equal to a first threshold size and the second attribute is a message size less than or equal to a second threshold size.

5. The method of claim 1, wherein the first attribute indicates that the first message is a non-persistent message and the second attribute indicates that the second message is a persistent message.

6. The method of claim 1, wherein the plurality of tasks to be performed include a plurality of steps of an operation of the client application, each of the plurality of steps being capable of using a different one of the plurality of versions of the software component.

7. The method of claim 1, further comprising receiving a prioritized list of characteristics that are important to the client application and determining at least one of the first requirement or the second requirement from the prioritized list of characteristics.

8. The method of claim 1, further comprising:

determining that the second version of the software component has been updated to provide throughput at least as high as the first version of the software component for messages having the first attribute;

receiving, from the client application, a fourth requirement relating to a fourth task of the plurality of tasks, the fourth task comprising sending a fourth message from the client application using the message queuing software product, the fourth message having the first attribute, the fourth requirement indicating a need for optimal performance of the fourth task with respect to first attribute; and performing the fourth task using the second version based at least in part on the first version is heavily loaded with the other tasks.

9. A computer system for selecting versions of a software component of a message queuing software product to perform a plurality of tasks, the computer system comprising:

a memory having computer readable computer instructions; and a processor that executes the computer readable computer instructions to:

receive, from a client application, a first requirement relating to a first task of the plurality of tasks, the first task comprising sending a first message from the client application using the message queuing software product, the first requirement indicating a need for optimal performance of the first task with respect to a first attribute of the first message;

receive, from the client application, a second requirement relating to a second task of the plurality of tasks, the second task comprising sending a second message from the client application using the message queuing software product, the second requirement indicating a need for optimal performance of the second task with respect to a second attribute of the second message;

identify a plurality of versions of the software component that are available for use, the plurality of versions including a first version and a second version, the first version being a more recent version of the software component than the second version;

determine a first characteristic of the first version and a second characteristic of the second version, the first characteristic indicating that the first version provides a higher throughput than the second version for messages having the first attribute, the second characteristic indicating that the second version provides a higher throughput than the first version for messages having the second attribute;

determine, based at least in part on the first characteristic and the second characteristic, that the first version is a preferred version of the software component for satisfying the first requirement;

determine, based at least in part on the first characteristic and the second characteristic, that the second version is a preferred version of the software component for the satisfying the second requirement;

perform the first task using the first version and perform the second task using the second version, wherein the first task and the second task are performed at least partially concurrently;

receive, from the client application, a third requirement relating to a third task of the plurality of tasks, the third task comprising sending a third message from the client application using the message queuing software product, the third message having the first attribute, the third requirement indicating a need for optimal performance of the third task with respect to the first attribute;

determine, based at least in part on the first characteristic and the second characteristic, that the first version is a preferred version of the software component for satisfying the third requirement;

determine that the first version is heavily loaded with other tasks; and perform the third task using the second version.

10. The computer system of claim 9, wherein the processor further executes the computer readable computer instructions to:

receive, from the client application, a fourth requirement relating to a fourth task of the plurality of tasks, the fourth task comprising sending a fourth message from the client application using the message queuing software product, the fourth requirement indicating a desired quality of service;

determine that a third version of the plurality of versions of the software component is capable of providing the desired quality of service;

determine that the third version is a preferred version for satisfying the fourth requirement; and perform the fourth task using the third version.

11. The computer system of claim 10, wherein the processor further executes the computer readable computer instructions to determine that the third version is capable of providing the highest quality of service among the plurality of versions of the software component.

12. The computer system of claim 9, wherein the first attribute is a message size greater than or equal to a first threshold size and the second attribute is a message size less than or equal to a second threshold size.

13. The computer system of claim 9, wherein the first attribute indicates that the first message is a non-persistent message and the second attribute indicates that the second message is a persistent message.

14. The computer system of claim 9, wherein the plurality of tasks to be performed are a plurality of steps of an operation of the client application, each of the plurality of steps being capable of using a different one of the plurality of versions of the software component.

15. The computer system of claim 9, wherein the processor further executes the computer readable computer instructions to receive a prioritized list of characteristics that are important to the client application and determine at least one of the first requirement or the second requirement from the prioritized list of characteristics.

16. A computer program product for selecting versions of a software component of a message queuing software product to perform a plurality of tasks for a client application, the computer program product comprising:

a non-transitory computer readable storage medium having computer readable program code embodied therewith, the computer readable program code executable by a processor to perform a method comprising:

receiving, from the client application, a first requirement relating to a first task of the plurality of tasks, the first task comprising sending a first message from the client application using the message queuing software product, the first requirement indicating a need for optimal performance of the first task with respect to a first attribute of the first message;

receiving, from the client application, a second requirement relating to a second task of the plurality of tasks, the second task comprising sending a second message from the client application using the message queuing software product, the second requirement indicating a need for optimal performance of the second task with respect to a second attribute of the second message;

identifying a plurality of versions of the software component that are available for use, the plurality of versions including a first version and a second version, the first version being a more recent version of the software component than the second version;

determining a first characteristic of the first version and a second characteristic of the second version, the first characteristic indicating that the first version provides a higher throughput than the second version for messages having the first attribute, the second characteristic indicating that the second version provides a higher throughput than the first version for messages having the second attribute;

determining, based at least in part on the first characteristic and the second characteristic, that the first version is a preferred version of the software component for satisfying the first requirement;

determining, based at least in part on the first characteristic and the second characteristic, that the second version is a preferred version of the software component for the satisfying the second requirement;

performing the first task using the first version and performing the second task using the second version, wherein the first task and the second task are performed at least partially concurrently;

receiving, from the client application, a third requirement relating to a third task of the plurality of tasks, the third task comprising sending a third message from the client application using the message queuing software product, the third message having the first attribute, the third requirement indicating a need for optimal performance of the third task with respect to the first attribute;

determining, based at least in part on the first characteristic and the second characteristic, that the first version is a preferred version of the software component for satisfying the third requirement;

determining that the first version is heavily loaded with other tasks; and performing the third task using the second version.

17. The computer program product of claim 16, the method further comprising:

receiving, from the client application, a fourth requirement relating to a fourth task of the plurality of tasks, the fourth task comprising sending a third message from the client application using the message queuing software product, the fourth requirement indicating a desired quality of service;

determining that a third version of the plurality of versions of the software component is capable of providing the desired quality of service;

determining that the third version is a preferred version for satisfying the fourth requirement; and performing the fourth task using the third version.

18. The computer program product of claim 17, the method further comprising determining that the third version is capable of providing the highest quality of service among the plurality of versions of the software component.

19. The computer program product of claim 16, wherein one of: i) the first attribute is a message size greater than or equal to a first threshold size and the second attribute is a message size less than or equal to a second threshold size or ii) the first attribute indicates that the first message is a non-persistent message and the second attribute indicates that the second message is a persistent message.

20. The computer system of claim 9, wherein the processor further executes the computer readable computer instructions to:

determine that the second version of the software component has been updated to provide throughput at least as high as the first version of the software component for messages having the first attribute;

receive, from the client application, a fourth requirement relating to a fourth task of the plurality of tasks, the fourth task comprising sending a fourth message from the client application using the message queuing software product, the fourth message having the first attribute, the fourth requirement indicating a need for optimal performance of the fourth task with respect to first attribute; and perform the fourth task using the second version based at least in part on the first version is heavily loaded with the other tasks.

* * * * *